US006843605B2

(12) United States Patent
Tamada et al.

(10) Patent No.: US 6,843,605 B2
(45) Date of Patent: Jan. 18, 2005

(54) ROLLER THRUST BEARING

(75) Inventors: Kenji Tamada, Kuwana (JP); Kikuo Maeda, Kuwana (JP); Tomoaki Kawamura, Iwata (JP); Hirokazu Nakashima, Kuwana (JP); Takumi Fujita, Kuwana (JP); Mitsuo Sasabe, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/247,327

(22) Filed: Sep. 20, 2002

(65) Prior Publication Data

US 2003/0063829 A1 Apr. 3, 2003

(30) Foreign Application Priority Data

Sep. 26, 2001 (JP) ......................................... 2001-292742
Nov. 22, 2001 (JP) ......................................... 2001-357710

(51) Int. Cl.$^7$ .............................................. F16C 19/30
(52) U.S. Cl. ....................................... 384/618; 384/619
(58) Field of Search ................................ 384/618, 609, 384/620, 621, 622, 623, 619

(56) References Cited

U.S. PATENT DOCUMENTS

| 706,938 | A | * | 8/1902 | Hendrick ..................... 384/622 |
| 718,111 | A | * | 1/1903 | Eveland ....................... 384/623 |
| 1,373,929 | A | * | 4/1921 | Wisdom ....................... 384/618 |
| 2,117,633 | A | * | 5/1938 | Smith ........................... 384/623 |
| 2,959,458 | A | | 11/1960 | Kaye |
| 3,091,501 | A | * | 5/1963 | Satrum ........................ 384/593 |
| 3,380,790 | A | * | 4/1968 | Osmond ..................... 384/618 |
| 4,953,993 | A | * | 9/1990 | Bahr ........................... 384/623 |
| 5,630,668 | A | * | 5/1997 | Ikezawa et al. ............. 384/527 |

FOREIGN PATENT DOCUMENTS

| DE | 11 63 612 B | 2/1964 |
| DE | 1163812 | 2/1964 |
| DE | 1525124 | 7/1969 |
| DE | 1 525 124 A | 7/1969 |
| DE | 31 34 625 A | 4/1983 |
| DE | 41 04 611 A | 8/1992 |
| FR | 567 239 A | 2/1924 |
| FR | 567239 | 2/1924 |
| FR | 1 223 324 A | 6/1960 |
| GB | 799 789 A | 8/1958 |
| JP | 63-303227 | 12/1988 |
| JP | 1-137870 | 11/1989 |
| JP | 8-166014 | 6/1996 |
| JP | 09-14131 | 1/1997 |
| JP | 09 014131 A | 1/1997 |
| JP | 9-236119 | 9/1997 |
| JP | P2000-234147 A | 8/2000 |
| JP | 2000-240645 A | 9/2000 |
| JP | P2001-187921 A | 7/2001 |
| JP | 2001-311426 | 11/2001 |

OTHER PUBLICATIONS

"Collection of Well–known and Routine Techniques", (Thrust Roller Bearing), Japanese Patent Office, Dec. 27, 1983, p. 5.

* cited by examiner

Primary Examiner—Thomas R. Hannon
(74) Attorney, Agent, or Firm—McDermott Will & Emery LLP

(57) ABSTRACT

There is provided a roller thrust bearing providing reduced differential slip, free of significant friction and wear, and providing increased longevity against flaking. The present invention provides a thrust bearing in the form of a roller thrust bearing including at least two radially arranged rows of rollers and a cage holding the rollers, the rollers including at least one roller crowned.

20 Claims, 9 Drawing Sheets

ROLLER THRUST BEARING

BACKGROUND OF THE INVENTION

1. Field of the Invention

The present invention relates generally to roller thrust bearings including needle roller thrust bearings and particularly to thrust bearings arranged in rotative portions of electronic components of automobile transmissions (manual and automatic), transfers or compressors for automobile air conditioners and the like to support thrust loads exerted on the rotative portions.

2. Description of the Background Art

With reference to FIGS. 6A and 6B, a roller thrust bearing 1 includes a plurality of circumferentially, radially equally arranged rollers 2, a cage 3 formed in a circular ring and holding the plurality of rollers 2 rotatably, and outer and inner rings 4 and 5 serving as a roller bearing ring sandwiching and thus supporting the plurality of rollers 2 on their opposite sides. Outer and inner rings 4 and 5 are each formed in a circle formed of a metal plate having a sufficient hardness. Outer ring 4 has a circular ring surface 6 of its own and inner ring 5 has a circular ring surface of its own.

A roller thrust bearing is a bearing having a variety of advantages. For example it can have a simple structure and still provide high load capacity and high rigidity. Furthermore it can be structured without the aforementioned roller bearing ring and formed of a cage and a roller alone. In that case, a shaft, a housing or the like that has a counterpart rolling contact surface to the roller is provided with roughness, hardness or any other similar function comparable to the bearing's ring surface, and using the shaft, the housing or the like as a ring surface allows the bearing to dispense with a roller bearing ring and thus be compact. In particular, a roller thrust bearing using a needle roller, or a needle roller thrust bearing, can be decreased in height, as seen in cross section, and thus suitable for compact mechanical designs.

A main application of a needle roller thrust bearing, a typical example roller thrust bearings, is a compressor of an automobile air conditioner. It includes a variety of types. For example, FIG. 7 shows a double-inclined-plate compressor in which a 2-side inclined plate 9 secured to an input rotary shaft 8 allows a piston 10 to reciprocate. As another example, FIG. 8 shows a single-inclined-plate compressor in which a 1-side inclined plate 12 secured to an input rotary shaft 11 allows a piston 14 to reciprocate via a rod 13. As still another example, FIG. 9 shows a variable-capacity, single-inclined-plate compressor in which an inclined plate 16 secured variably in angle to an input rotary shaft 15 allows a piston 18 to reciprocate via a rod 17. The above types all have a rotative portion incorporating a roller bearing.

Note that the FIGS. 7–9 compressors do not necessarily belong to conventional art. They should be considered an apparatus which will further be improved in future for example through further development of a roller thrust bearing contemplated by the present invention. In other words, they are an apparatus having its internal components being improved in structure, material and the like.

In a typical bearing, such as ball bearings, a differential slip is introduced between a rolling element and a roller bearing ring. The differential slip of such bearings basically depends on a difference in circumferential velocity in a contact surface of the rolling element and the roller bearing ring. More specifically, a ball bearing provides a point contact and hence a small contact area. As such, within a contact surface their difference in circumferential velocity and hence their differential slip would be small.

In contrast, in a roller thrust bearing, as basically structured, a rolling element in the form of a cylindrical roller is arranged on a roller bearing ring having a planar ring surface, the roller and the roller bearing ring contact each other in a line, and the bearing's center of rotation matches the roller's center of revolution. In that case, the circumferential velocity on a rolling contact surface of the roller is the same velocity, whereas the roller bearing ring contacting the roller as it rotates provides a circumferential velocity increasing, as seen radially outward, away from the bearing's center of rotation (in proportion to the roller bearing ring's radius of rotation). Therefore the roller and roller bearing ring's difference in circumferential velocity has a maximal value at the roller's opposite ends. In theory, only on a pitch circle of the bearing a no-slip rolling movement is provided. From a point on a pitch circle of the roller toward the opposite ends of the roller, the difference in circumferential velocity between the roller and the roller bearing ring increases, and the differential slip increases, in proportion to the roller's length.

As aforementioned, differential slip internal to a roller thrust bearing is greater than those of bearings of different types. As such, a differential slip of the roller and the roller bearing ring disadvantageously causes generation of a stress at the roller's edge that is introduced between the roller bearing ring and the roller, which causes flaking of an edge of a rolling and running portion of the roller bearing ring that starts at a surface thereof.

The above disadvantage has conventionally been addressed by a bearing having a roller reduced in length to reduce relative slippabiliy of the roller's end surface or a bearing having two rollers arranged in each pocket of the cage, i.e., in multiple rows. Furthermore, the disadvantageous stress or load on the roller's end overcome for example by using a crowned roller (Japanese patent Laying-open No. 9-14131).

There is a demand for a roller thrust bearing reduced in size to save energy and space and have a reduce weight (a reduced friction loss). Accordingly, the bearing in use encounters an increasingly severe condition in terms of load capacity. As aforementioned, in a roller thrust bearing a differential slip of a roller and a roller bearing ring increases friction loss and wear that are caused at a contact surface. Furthermore the contact surface's oil film formation is impaired, and at the roller's edge an edge stress between the roller bearing ring and the roller itself is readily introduced, which causes flaking of an edge of a rolling and running portion of the roller bearing ring that starts at a surface thereof. The differential slip may be reduced simply by reducing the roller in length. This, however, reduces the roller's contact area and thus provides increased contact pressure. Contact pressure at the contact surface thus increases, which results in impaired oil film formation and the exfoliation (flaking) for example disadvantageously occurs at the roller's radically outer surface.

A compressor uses a bearing having an interior with the bearing's lubricant mixed with a coolant. Furthermore, as the compressor contracts and expands, the lubricant is liquefied and vaporized repeatedly. The lubricant is thus disadvantageously reduced in amount. As such, a worse oil film is formed than when a typical machine operating lubricant is used, and the bearing flakes earlier than expected.

Furthermore to address global warming and other similar environmental issues a compressor for an air conditioner uses HCFC134a or other similar alternative flon as its coolant. These alternative flons are considered as being poorer in self-lubricity than conventionally used coolants. With the alternative flon dissolved and thus mixed, the lubricant for example has a reduced kinematic viscosity, and the bearing has a significantly impaired oil film formation. As such, the bearing would have a rolling element, a roller bearing ring and the like flaking, wearing or having a surface similarly damaged, resulting in reduced longevity.

This may be handled by improving the lubricant. However, because of its chemistry with the coolant, the lubricant can only be selected from a limited range and a significantly enhanced ability to form an oil film cannot be expected. Increasing the amount of the lubricant in the coolant to enhance lubricity decreases the amount of the coolant and thus impairs the compressor's cooling ability.

As used in an air conditioner's compressor, a needle roller thrust bearing receives a thrust load offset from the center of rotation and rotates rapidly at no less than approximately 8,000 rpm. Such a rotation rate and a load are also severer conditions, increasing a defect indicating damage of a surface of the bearing that is attributed to a differential slip.

SUMMARY OF THE INVENTION

In view of the above the present invention contemplates a roller thrust bearing reducing a differential slip, free of significant friction and wear, and providing excellent flaking resistance.

The present invention provides a roller thrust bearing including at least two radially arranged rows of rollers and a cage holding the rollers, the rollers including at least one crowned roller.

The plurality of rows of rollers can effectively reduce a differential slip. Furthermore, the crowned roller can have a reduced effective length to synergistically, effectively reduce the differential slip. In addition, the crowned geometry can effectively alleviate a load that is introduced at an edge. Simultaneously, the bearing's torque can also be reduced.

Furthermore the cage preferably has a pocket each holding a single roller so that the roller can be held in steady manner to prevent the roller's skew. Furthermore, friction torque attributed to the roller's skew can also be reduced.

Furthermore a radially outer row can have less crowned rollers than the radially innermost row. The radially outer rollers can thus have a larger effective length to reduce contact surface pressure and thus prevent flaking of the radially outer rollers and a roller bearing ring radially outer than the radially outer rollers.

Furthermore, at least one row radially outer than the radially innermost row is preferably formed of straight rollers. As well as the radially outer rollers less crowned than radially inner rollers, as described above, the radially outer, straight rollers can similarly have a larger effective length to reduce contact surface pressure and thus prevent flaking of the radially outer rollers and a roller bearing ring radially outer than the radially outer rollers.

Furthermore, at least one row radially outer than the radially innermost row may be formed of rollers larger in length than the radially innermost row to reduce a relative slip of the radially inner rollers and increase a load capacity of the radially outer rollers to prevent flaking of the radially outer rollers and a roller bearing ring radially outer than the radially outer rollers.

Furthermore the roller can have at least one end surface spherically shaped to prevent rollers from having their end surfaces significantly interfering with each other and the rollers' end surfaces and the cage's pockets from significantly interfering with each other and thus reduce the rollers' skew. Furthermore, friction torque attributed to the rollers' skew can also be reduced.

Furthermore, at least one row radially outer than the radially innermost row may have rollers no less in number than the radially innermost row to increase a load capacity of the radially outer rollers to prevent flaking of the radially outer rollers and a roller bearing ring radially outer than the radially outer rollers.

Furthermore the roller can be a needle roller. A bearing with the needle roller also has an effect similar to that described above.

The above-described roller thrust bearing can be incorporated in a compressor for use. In the compressor, despite space-saving required and a peculiar condition for lubrication including a coolant, as has been described previously, the roller thrust bearing can be free of significantly impaired oil film formation.

The present invention provides another roller thrust bearing including a crowned roller and a roller bearing ring contacting the roller, the roller bearing ring containing no less than 10,000 to less than 40,000 grains/mm$^2$ of carbide at least to a depth of 0.1 mm, as measured from a surface layer thereof, the grain having a diameter size of no less than 0.6 μm.

The roller that is crowned can eliminate a differential slip at an edge to reduce a load. In roller bearing ring the carbide acts as a resistance to deformation to enhance the strength of the material(s) of the surface layer. Furthermore, if between the roller and the roller bearing ring a differential slip, poor lubrication or the like is introduced and the roller bearing ring has a surface generating heat, plastic flow can be prevented.

In the roller bearing ring at at least the surface layer to the depth of 0.1 mm the carbide having a grain of 0.6 μm or larger in size can be precipitated such that 10,000 or more of such grains exist in each unitary area of 1 mm$^2$ to allow the carbide to act as a resistance to plastic deformation of the surface layer. To obtain a higher level of an effect of the resistance, no less than 14,000 grains/mm$^2$ are desirably precipitated. More than 40,000 grains/mm$^2$ reduce flaking resistance. Note that the grain size is an average grain size with respect to direction if the carbide is not spherical.

The density of the carbide of the surface layer of the roller bearing ring, as described above, can be obtained for example as follows: a SCM415 material is processed. For carburization, 890° C. by one hour is set and a furnace internally is set to have an internal atmosphere with a carbon potential of 1.5 to 2.0%. For quenching, 840° C. by 0.5 hour is set and a furnace is set to have an internal atmosphere with a carbon potential of 1.0 to 2.0%. Thereafter, the material is oil-quenched to provide the above density. The present invention is applicable to other steel than carburized steel, such as bearing steel, carbon steel and the like.

The density may be measured using an electronic microscope in a direct, thin film observation, an observation of an extraction replica, or a 2-stage replica observation, or it may be measured by observing a polished, etched surface of a sample via a scanning electronic microscope.

The crowned roller can eliminate a differential slip that is introduced at an edge and reduce a load and the roller bearing ring with the above carbide added to its surface layer can mainly enhance a resistance to plastic deformation. Combining the crowned roller and the roller bearing ring having a surface layer with a high density of carbide distributed therein, can provide a remarkable resistance to surface-flaking that significantly exceeds an effect achieved by a conventional needle thrust bearing with these requirements provided separately thereto and then added together. In other words, resistance to surface-flaking can significantly be enhanced by synergism of the roller that is crowned and the high density of carbide distributed in the surface layer of the roller bearing ring. Furthermore, in the roller bearing ring, the roller and the like, wearability is significantly reduced.

The above, another roller thrust bearing can include at least two rows of rollers including at least one crowned roller.

The plurality of rows of rollers allow a differential slip to be distributed to small, multiple rows. Furthermore the crowned roller can contribute to a reduced load of an edge. As a result, a significantly increased longevity can be obtained against surface-flaking. Furthermore, friction torque can also be reduced and for example an automobile's air conditioner can be operated at a reduced power cost.

The carbide in the roller bearing ring at the at least surface layer to the depth of 0.1 mm may have a distribution precipitated in a range of no less than 0.8% to less than 10% per unit area.

This can enhance both the roller bearing ring's anti-wearability and longevity against flaking. The carbide of the above a real percentage is obtained for example as follows: a SCM415 material is processed. For carburization, 890° C. by one hour is set and a furnace is set to have an internal atmosphere with a carbon potential of 1.5 to 2.0%. For quenching, 840° C. by 0.5 hour is set and a furnace is set to have an internal atmosphere with a carbon potential of 1.0 to 2.0%. Thereafter, the material is oil-quenched to provide the above density. The present invention is also applicable to other steel than carburized steel of SCM415, such as bearing steel, carbon steel and the like.

Preferably the above bearing has at least two rows of rollers, wherein a radially outer row has rollers less crowned than the radially innermost row or free of crowning.

The less crowned roller does not significantly reduce a rolling contact portion, so that a load capacity of the radially outer rollers can be enhanced and a load contact pressure of each of the radially outer rollers can be reduced. As such, the radially outer rollers and a roller bearing ring rotating and moving with the radially outer rollers can be free of flaking.

The bearing can have a cage holding the roller, the cage having a pocket arranged to accommodate no less than two rollers with an axial direction extending radially.

The cage thus structured can be processed at a reduced cost and a skew per roller can be reduced.

Furthermore, the bearing may have a cage holding the roller, the cage having at least two rows of pockets each accommodating a single roller.

This can reduce a skew of a roller due to a support of the cage. Furthermore, it can also reduce friction torque. For example if it is used in an inclined-plate compressor for an automobile air conditioner the former allows the latter to be operated at a reduced power cost.

Furthermore, the bearing may have at least two rows of rollers, wherein a radially outer row has rollers no less in length than a radially inner row.

The radially inner rollers can be free of significant differential slip and the radially outer rollers can have a larger rolling contact portion than the radially inner rollers to provide enhanced load capacity.

The roller may have an end surface curved to protrude outward.

The geometry as above can prevent rollers from having their end surfaces interfering with each other and the rollers' end surfaces and the cage's pockets from interfering with each other. It can also reduce the rollers' skew and friction torque.

The above roller thrust bearing may have at least two rows of rollers, wherein a radially outer row has rollers no less in number than a radially inner row.

This can increase a load capacity of the radially outer rollers.

The roller bearing ring may have a surface having a Rockwell C scale hardness (HRC) of no less than 58.

The roller bearing ring having the above hardness can reduce a plastic flow of an edge portion of a rolling and running trace to be smaller than a conventional roller bearing ring and also enhance anti-wearability. For less than HRC 58, anti-wearability is insufficiently enhanced, substantially equivalent to that of a conventional roller bearing ring.

In accordance with the present invention, in an inclined-plate compressor having an inclined plate secured to and rotated around a main shaft to reciprocate a piston, a roller thrust bearing is provided at a portion contacting the inclined plate to receive a thrust load introduced as the main shaft rotates and the piston reciprocates. The bearing includes a crowned roller and a roller bearing ring contacting the roller, the roller bearing ring containing no less than 10,000 to less than 40,000 grains/mm$^2$ of carbide at least to a depth of 0.1 mm, as measured from a surface layer thereof, the grain having a diameter size of no less than 0.6 μm.

In the roller thrust bearing arranged in contact with an inclined plate there is introduced a differential slip between a roller bearing ring and a roller. This differential slip negatively affects a formation of an oil film of a contact surface and impairs a lubricant in lubricity. In addition for example for a roller thrust bearing for an inclined-plate compressor for an automobile air conditioner, as aforementioned, a lubricant is thinned in use for example with a coolant of the air conditioner. This results in further impaired lubricity. Consequently, a rolling contact surface generates heat and a surface readily flakes or has similar damage. However, combining the crowned roller and the roller bearing ring having a surface layer with a high density of carbide distributed therein, can provide a remarkably excellent resistance to surface-flaking for example despite a condition for lubrication with a coolant of an automobile air conditioner and a lubricant mixed together. This resistance to surface-flaking can obtain a remarkably improved, synergetic effect that significantly exceeds an effect achieved by adding together effects of providing the roller, the roller bearing ring and the like with the above requirements separately.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 9:
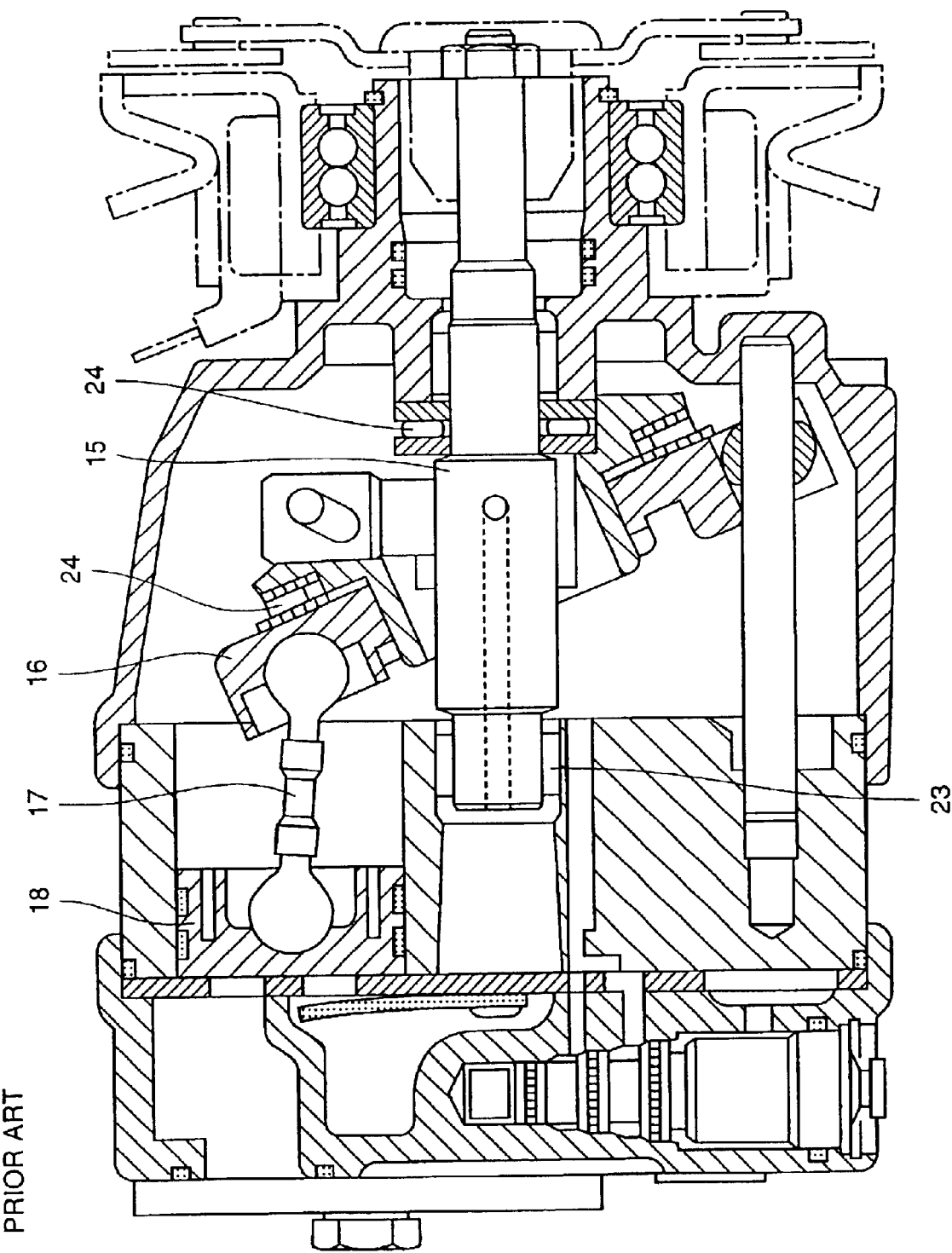
FIG. 9 is a longitudinal cross section of a variable-capacity, single-inclined-plate compressor for an air conditioner

The present invention in an embodiment provides a needle thrust bearing incorporated for use in a prescribed rotative portion of a compressor for an automobile air conditioner shown in FIGS. 6A–8. Specifically, by way of example, for the FIG. 7 double inclined plate type, a needle roller bearing with a cage 19 and a needle roller thrust bearing 20 are used. For the FIG. 8 single inclined plate type, a shell needle roller bearing 21 and a needle roller thrust bearing 22 are used. For the FIG. 9 variable-capacity, single inclined plate type, a needle roller bearing with a cage 23 and a needle roller thrust bearing 24 are used. The needle roller thrust bearing, having an advantage such as smallness in height, as seen in cross section, is thus used in a compressor particularly in applications requiring space-saving.

As described above, the FIGS. 7–9 compressors of automobile air conditioners should be considered an apparatus which will further be improved in future for example through further development of the roller thrust bearing contemplated by the present invention. In other words, they are an apparatus having internal components to be further improved in structure, material and the like.

(1) Geometry of Roller

Figure 1A:
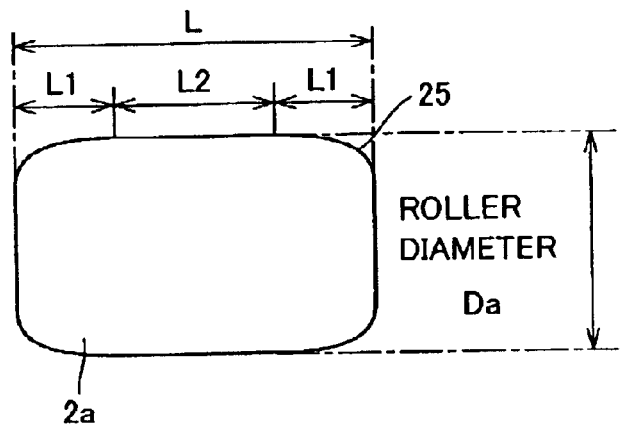
FIG. 1A shows a roller of a roller thrust bearing of an embodiment of the present invention.

FIG. 1A shows a geometry of a roller 2a crowned 25. Roller 2a has a length L, with opposite ends crowned by a length $L_1$. The crowned roller can reduce a load on an edge (or reduce edge stress) and the roller having a reduced effective length (a straight portion $L_2$) can reduce differential slip.

Figure 1B:
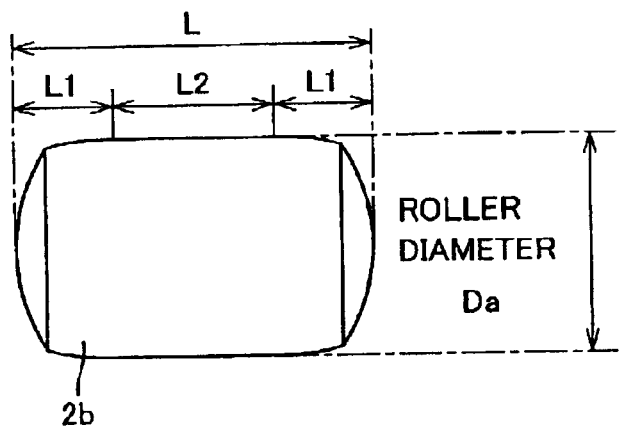
FIG. 1B shows another roller of a roller thrust bearing of an embodiment of the present invention.

FIG. 1B shows a roller having opposite end surfaces rounded. This structure can reduce edge stress that is caused by contact of an internal surface of a pocket of the cage and the roller's end surface in the pocket's plane, prevent rollers from having their end surfaces interfering with each other and the rollers' end surfaces and the cage's pockets from interfering with each other, and thus reduce the rollers' skew. Furthermore, a friction torque attributed to the roller's skew can also be reduced. The aforementioned round geometry is typically ±50% of a roller diameter Da.

Figure 1C:
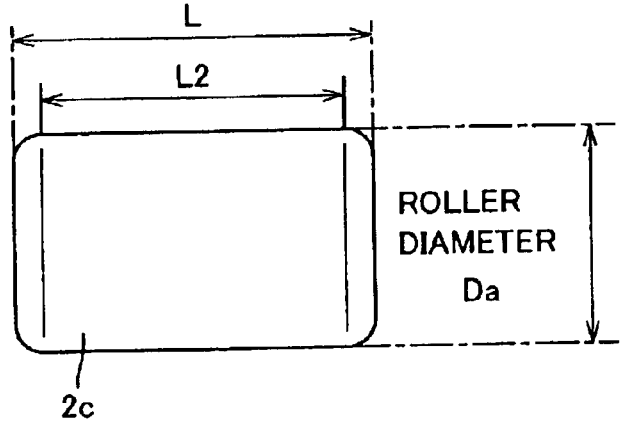
FIG. 1C shows another roller used in a roller thrust bearing of an embodiment of the present invention together with the FIG. 1A roller and/or the FIG. 1B roller.

In contrast to FIG. 1A, FIG. 1C shows a non-crowned roller, i.e., a straight roller. The non-crowned roller can have a straight potion with an increased length. It can reduce contact surface pressure in a condition free of a tilted rolling and running surface, in particular. Note that in the present invention the straight roller is arranged in at least one row radially outer than the innermost row. These rollers are typically formed of bearing steel having a surface hardness of HRC 60 to 65.

(2) Arrangement of Roller

Figure 2A:
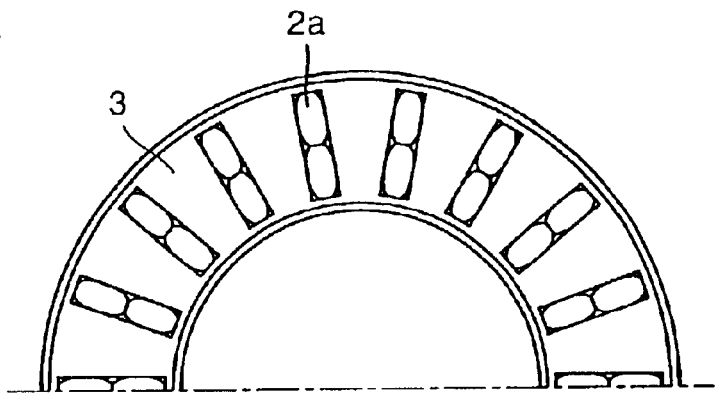
FIG. 2A is a plan view of an upper half of a roller thrust bearing of an embodiment of the present invention (a first embodiment)
Figure 2B:
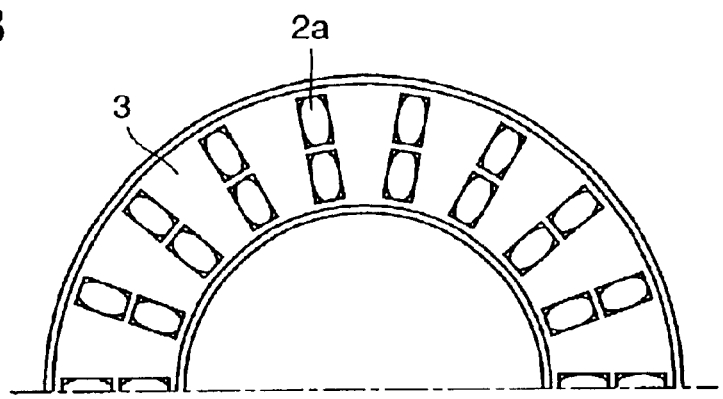
FIG. 2B is a plan view of an upper half of another roller thrust bearing of an embodiment of the present invention (the first embodiment)
Figure 2C:
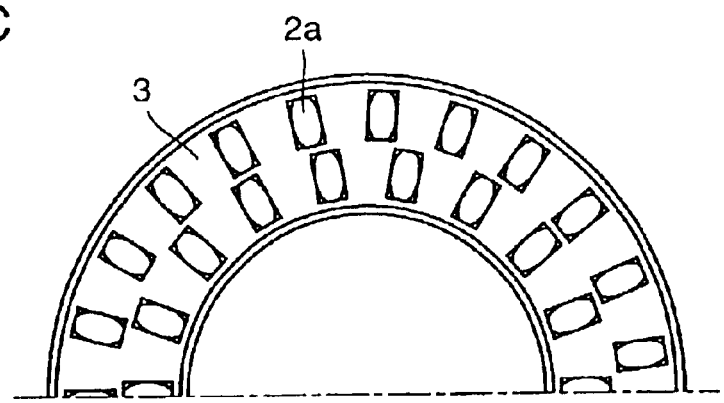
FIG. 2C is a plan view of an upper half of still another roller thrust bearing of an embodiment of the present invention (the first embodiment)

FIGS. 2A to 2C are each a plan view of a half of a roller thrust bearing used in a first embodiment of the present invention described hereinafter. FIG. 2A shows a roller thrust bearing with a cage having a single row of pockets each accommodating rollers 2a crowned at opposite ends and arranged radially in two rows. Configuration is used in first and second embodiment for sample 4 of an example of the present invention, as will be described hereinafter. FIG. 2B shows a roller thrust bearing with a cage having two rows of pockets each holding a single crowned roller. This configuration is used in the second embodiment for sample 5 of an example of the present invention. FIG. 2C shows a roller thrust bearing with a radially outer, at least one row of rollers equal to or larger in number than the radially innermost rollers. This can increase the load capacity of the radially outer rollers to be larger than that of the radially innermost rollers. This configuration is used in the second embodiment for sample 10 of an example of the present invention.

(3) Cage

Figure 3A:
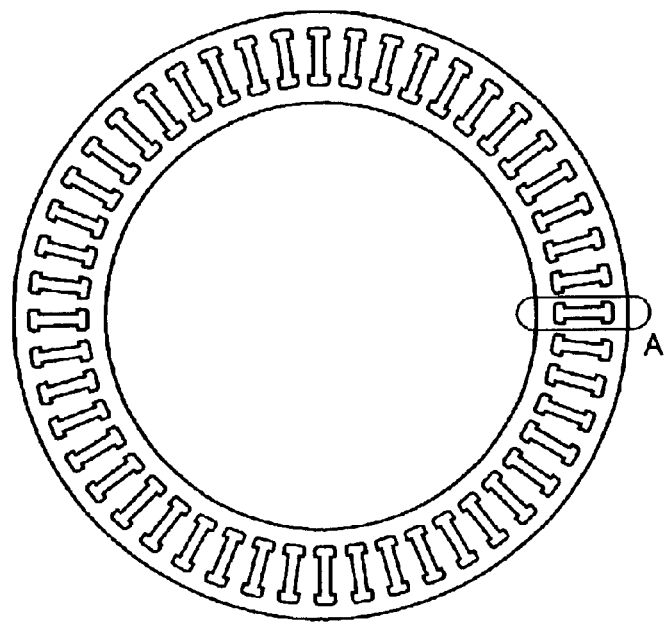
FIG. 3A is a plan view of a needle roller thrust bearing if an embodiment of the present invention with a resin mold cage (a second embodiment)
Figure 3B:
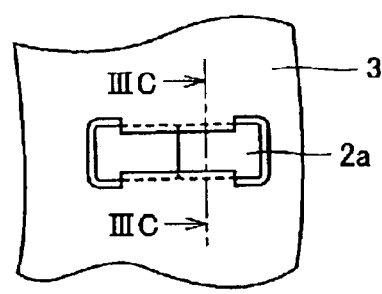
FIG. 3B is an enlarged view of a portion A of FIG. 3B (the second embodiment)
Figure 3C:
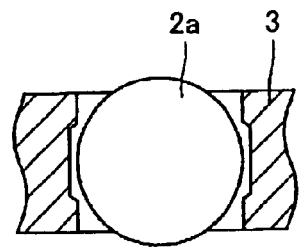
FIG. 3C is a cross section of FIG. 3B taken along a line IIIC—IIIC (the second embodiment)

FIGS. 3A–3C and 4A–4C show cages in an embodiment of the present invention. FIGS. 3A–3C shows one form (sample 4) used in the second embodiment of the present invention. It uses a resin molded cage formed by injection-molding and a needle roller. In the present form, cage 3, inject-molded, can be provided with a pocket having a more complicated geometry. As shown in FIG. 3B, each pocket holds two (or two rows of) rollers and it has a protrusion at its center to prevent the roller from displacing. As shown in FIG. 3C, the protrusion allows cage 3 to hold roller 2.

Figure 4A:
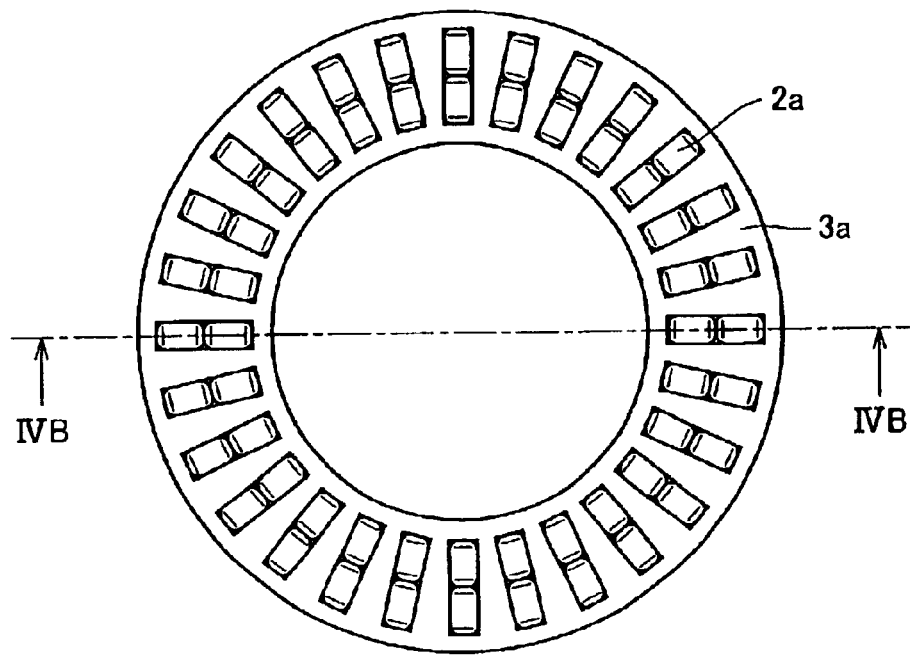
FIG. 4A is a plan view of a needle roller thrust bearing of an embodiment of the present invention with a box-like, iron plate pressed cage (the second embodiment)
Figure 4B:
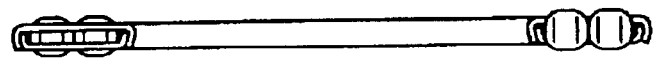
FIG. 4B is a cross section of FIG. 4B taken along a line IVB—IVB (the second embodiment)
Figure 4C:
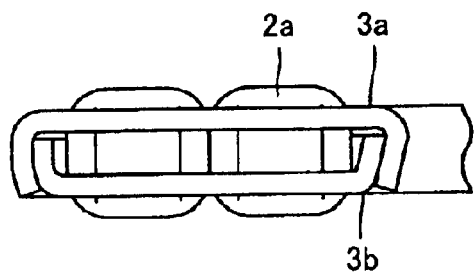
FIG. 4C is an enlarged view of a pocket of FIG. 4 (the second embodiment)

FIGS. 4A–4C shows another form of the second embodiment using a cage pressed formed by an iron plate in the form of a box and a needle roller. The present form is equivalent to that shown in FIGS. 3A–3C and also corresponds to sample 4. The cage of the present form can be press-formed inexpensively. As shown in FIG. 4C, two members 3a and 3b press-formed by an iron plate clamp two rollers 2 in one pocket and thus assemble the form of a box. Note that the pocket has a width smaller than the roller's diameter so that cage 3 can hold roller 2.

If the roller thrust bearings of FIGS. 3A–3C and 4A–4C use a roller having a diameter Da and a length L, $Da \leq 5$ mm and $1 \leq L/Da \leq 10$ are preferably defined. More specifically, for $L/Da \leq 1$, the roller is reduced in length and hence effective length. The roller's contact area is reduced and an increased contact surface pressure is thus provided. In the contact surface, contact surface pressure is increased, which results in an impaired oil film formation and the exfoliation for example disadvantageously occurs at the roller's radially outer surface.

For $10 \leq L/Da$, the roller is increased in length and hence effective length and a differential slip of the roller and a ring surface increases. At the roller's edge an edge stress between the roller bearing ring and the roller itself is readily introduced, which causes disadvantageous flaking of an edge of a rolling and running portion of the roller bearing ring that starts at a surface thereof.

First Embodiment

A longevity test was conducted using the above roller thrust bearing to verify that the present roller thrust bearing can contribute to a reduced differential slip of the roller's end surface and a reduced stress concentration in a vicinity of the roller's end, and a reduced friction loss and wear internal to the bearing to provide an increased longevity of an edge of a rolling and running portion against flaking.

The tested bearing had a roller having a diameter of 3 mm, a roller bearing ring having an inner diameter of 65 mm and an outer diameter of 85 mm. The test was conducted at a temperature of 60–80° C. with a load of 1,000 kgf at 500 rpm with a spindle oil VG2 (oil film parameter, lambda: 0.101) applied as a lubricant.

The test provided a result, as shown in Table 1, together with that of a comparative example, a needle roller thrust bearing having a standard roller and a standard cage. Longevity was represented by a 10% longevity of 10 test bearings. Note that the roller had a length of 7.8 mm for a single row and 3.8 mm by two for two rows and it was crowned (or dropped) by 5 to 15 micrometers. Longevity was defined as the time when any of the members of the bearing being tested flaked.

As understood from Table 1, if comparative example sample 1 (a standard bearing) had a longevity of 1, then sample 2, having two rows of rollers, had a longevity 2.5 times sample 1, and sample 3, having crowned rollers (in a single row), had a longevity 4.9 times sample 1, whereas sample 4, having two rows of crowned rollers, as provided in the present invention, had a longevity 7.5 times sample 1 and thus significantly larger than samples 1 and 2, with its rollers completely free of flaking, as observed after it was tested. Furthermore in the test a motor consumed a smallest current of 3.9A for sample 4, which indicates that the bearing was of a low torque and it can be understood that friction loss internal to the bearing was reduced.

It is thus apparent that a roller thrust bearing having two or more rows of crowned rollers can effectively reduce friction loss and wear, provide an increased longevity against that flaking of an edge of a rolling and running trace which starts at a surface thereof, and prevent the roller's radially outer surface from flaking.

Second Embodiment

Two rows of crowned rollers varying in effective length and in geometry at their end surfaces were used in a test. The test provided a result, as shown in Table 2. A cage having pockets arranged radially in two rows or more (sample 5) prevented interference between rollers, enhanced the cage's ability to hold the rollers, reduced the rollers' skew to reduce friction loss and wear to provide an increased longevity against flaking, providing a ratio of 1.5 by the 10% longevity.

It is apparent from the test result that for two or more rows of rollers with a radially inner row of crowned rollers and a radially outer row of rollers less crowned than the inner rollers (sample 6) and two or more rows of rollers with a radially outer row alone formed of straight rollers (sample 7), reducing the contact surface pressure of the radially outer rollers, as compared to that of the radially inner rollers, can prevent flaking of the rollers' radially outer surfaces and a roller bearing ring's radially outer side to provide an increased longevity.

For a radially inner row of rollers increased in length and a radially outer row of rollers smaller in length than the radially inner rollers (sample 8, with the inner rollers shorter and the outer rollers longer than those in two rows of other embodiments), increasing the load capacity of the radially outer row, as compared to that the radially inner row, prevented flaking of the rollers' radially outer surfaces and the roller bearing ring's radially outer side and also reduced a differential slip of the radially inner rollers, and significantly exhibited an enhanced longevity (a ratio of 1.5 by the 10% longevity). The test results reveal that it is similarly effective to provide radially outer, circumferential rollers (or pockets) equal or greater in number to or than radially inner rollers to increase a load capacity of the radially outer row (FIG. 2C).

Furthermore, rollers that have a spherical surface (samples 9 and 10) prevented the rollers having their end surfaces interfering with each other and the rollers' end surfaces and the cage's pockets interfering with each other and thus remarkably presented an increased longevity (ratios of 1.3 and 1.6 by the 10% longevity) As a motor consumed a current smaller than in samples 4 and 5, it is also apparent that they are effective in reducing friction of the roller's skew and reducing the bearing's torque. Furthermore in samples 4–10 of the present invention a motor tended to consume a smaller current than in the comparative example, which indicates that the bearing's internal friction loss is small and the bearing's torque is reduced.

TABLE 1

| | | Specification of Roller | | Estimation of Longevity | | Results of Longevity Test | | |
| --- | --- | --- | --- | --- | --- | --- | --- | --- |
| | Sample | Geometry: | No. of Rows of | 10% Longevity | Ratio in 10% | Presence/Absence of Flaking or Site of Flaking | | Torque Motor's Current |
| Classification | No. | crowned/straight | Rollers | (h) | Longevity | Roller Bearing Ring | Roller | Consumption (A) |
| Comparative Example | 1 | straight | 1 | 11 | 1.0 | edge of inner surface | outer surface | 7.0 |
| Comparative Example | 2 | straight | 2 | 28 | 2.5 | portion adjacent to radially inner row | outer surface of radially outer roller | 4.3 |
| Comparative Example | 3 | crowned | 1 | 54 | 4.9 | edge of inner surface | none | 5.7 |
| Example of the present invention | 4 | crowned | 2 | 83 | 7.5 | portion adjacent to radially inner row | none | 3.9 |

TABLE 2

| Classification | Sample No. | Specification of Roller | | | | | | | Ratio in 10% Longevity | Results of Longevity Test | | Torque Motor's Current Consumption (A) |
| --- | --- | --- | --- | --- | --- | --- | --- | --- | --- | --- | --- | --- |
| | | Radially Inner Roller | | | Radially Outer Roller | | Geometry of End Surface | No. of Rows of Pockets of Cage | | Presence/Absence of Flaking or Site of Flaking | | |
| | | Length of Roller (Ratio) | Geometry: crowned/straight | | Length of Roller (ratio) | Geometry: crowned/straight | | | | Radially Inner Side | Radially Outer Side | |
| Example of the present invention | 4 | 1 | crowned | | 1 | crowned | straight | 1 | 1.0 | edge of inner surface | none | 3.9 |
| Example of the present invention | 5 | 1 | crowned | | 1 | crowned | straight | 2 | 1.5 | edge of inner surface | none | 3.3 |
| Example of the present invention | 6 | 1 | crowned | | 1 | less crowned | straight | 1 | 1.0 | edge of inner surface | none | 4.1 |
| Example of the present invention | 7 | 1 | crowned | | 1 | straight | straight | 1 | 1.0 | edge of inner surface | none | 4.3 |
| Example of the present invention | 8 | 1 | crowned | | 1.2 | crowned | straight | 1 | 1.7 | edge of inner surface | none | 3.4 |
| Example of the present invention | 9 | 1 | crowned | | 1 | crowned | spherical | 1 | 1.3 | edge of inner surface | none | 3.5 |
| Example of the present invention | 10 | 1 | crowned | | 1 | crowned | spherical | 2 | 1.6 | edge of inner surface | none | 3.2 |

Third Embodiment

Figure 5A:
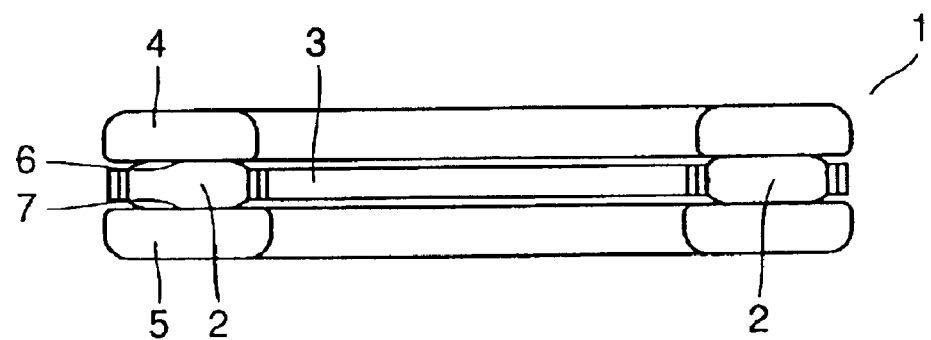
FIG. 5A is a longitudinal cross section of a needle roller thrust bearing of the present invention in a third embodiment.
Figure 5B:
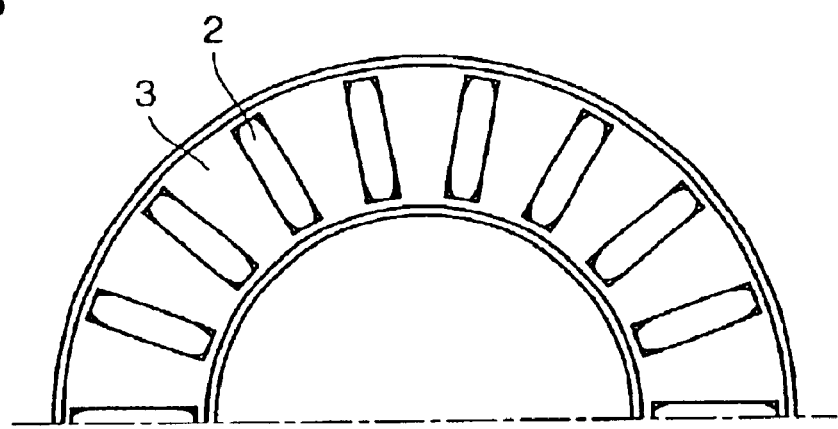
FIG. 5B is a plan view of an upper half of the rollers and cage of FIG. 5A.
Figure 6A:
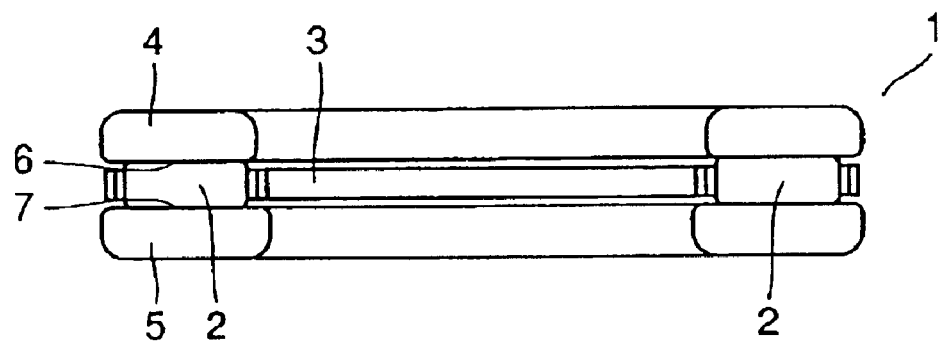
FIG. 6A is a longitudinal cross section of a conventional needle roller thrust bearing.
Figure 6B:
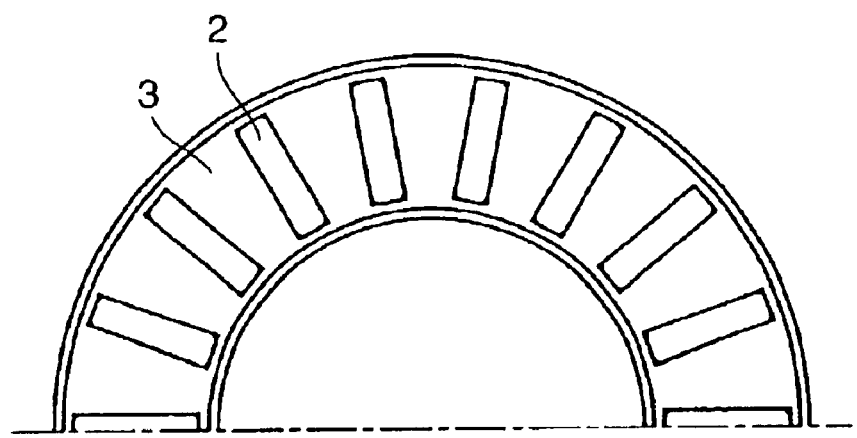
FIG. 6B is a plan view of an upper half of the rollers and cage of FIG. 6A.
Figure 7:
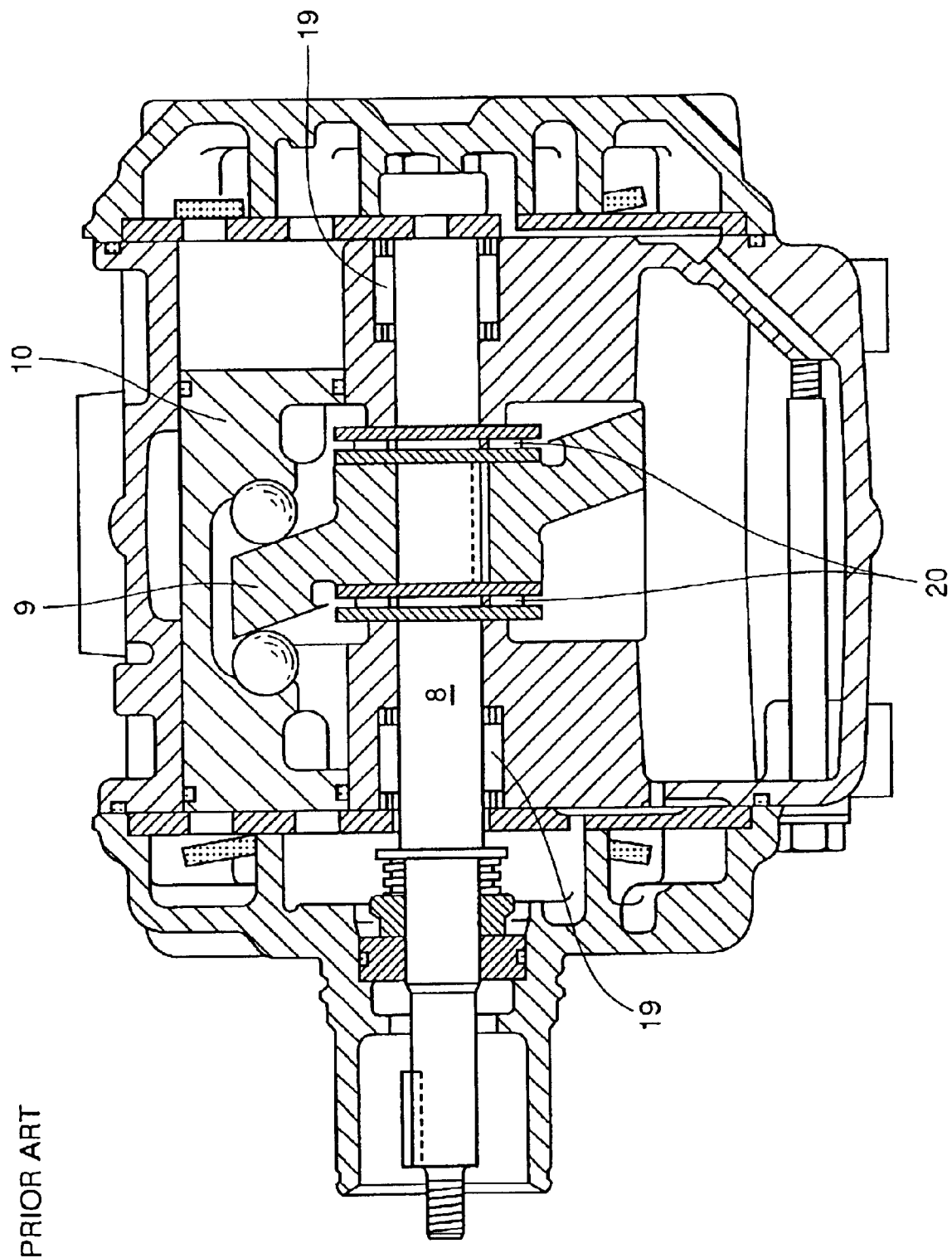
FIG. 7 is a longitudinal cross section of a double-inclined-plate compressor for an air conditioner.
Figure 8:
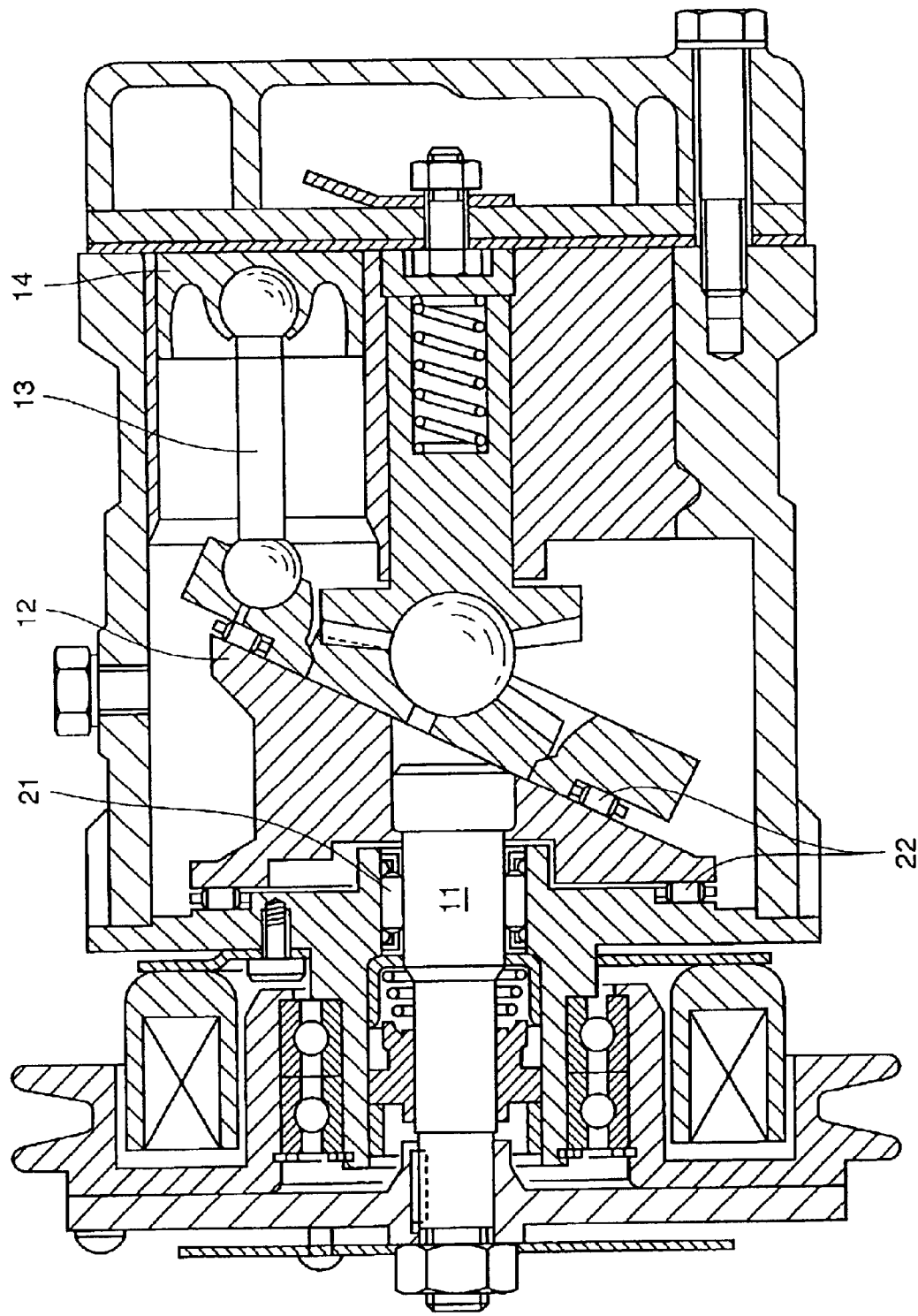
FIG. 8 is a longitudinal cross section of a single-inclined-plate compressor for an air conditioner.

A test was conducted using a needle thrust bearing 1 formed of roller bearing rings 4 and 5, a rolling element (or roller) 2 arranged between the roller bearing rings, and a cage 3 holding and guiding rolling element 2, as shown in FIGS. 5A and 5B. The rolling element was a crowned rolling element. Rolling contact surfaces 6 and were formed between roller bearing rings 4 and 5 and roller 2. The needle thrust bearing had the roller bearing ring, the rolling element and the cage configured as shown in Table 3.

TABLE 3

| Sample No. | Specification of Roller Bearing Ring | | Specification of Roller | | 10% Longevity (h) | Ratio in 10% Longevity | Portion flaked | | Motor's Current Consumption (A) |
| --- | --- | --- | --- | --- | --- | --- | --- | --- | --- |
| | No. of carbide per unit area ($mm^2$) | carbide per unit area (%) | Geometry of Roller | No. of Rollers | | | Roller Bearing Ring | Roller | |
| 31 (standard bearing) | 6540 | 0.5 | Straight | 1 row | 11 | 1 | edge of inner surface | outer surface | 7 |
| 32 (comparative example) | 6540 | 0.5 | Straight | 2 rows | 28 | 2.5 | portion adjacent to radially inner row | outer surface of radially outer roller | 4.3 |
| 33 (comparative example) | 6540 | 0.5 | Crowned | 1 row | 54 | 4.9 | edge of inner surface | none | 5.7 |
| 34 (comparative example) | 6540 | 0.5 | Crowned | 2 rows | 83 | 7.5 | portion adjacent to radially inner row | none | 3.9 |
| 35 (example of the present invention) | 39452 | 9.64 | Crowned | 2 rows | 227 | 20.6 | portion adjacent to radially inner row | none | 3.9 |

As shown in Table 3, of requirements of the present invention, in (a1) the density of a carbide of the roller bearing ring and the percentage in area of the carbide, (a2) difference between a single row of rollers and a plurality of rows of rollers, and (a3) the roller's geometry (crowned or not) a condition was changed in conducting a test to see how the above requirements affect longevity, resistant to flaking. More specifically the present inventors considered that by setting the above requirements within the range of the present invention, a roller can have an end surface free of a significant differential slip and a significant stress concentration therearound so that friction loss and wear can be reduced and the roller bearing ring's edge can have a long longevity, resistant to flaking, after the roller is rotated and run, and the inventors verified its effectiveness.

The longevity test was conducted using a bearing having a roller having a diameter of 3 mm, a race having an inner diameter of 65 mm and an outer diameter of 85 mm. The test was conducted at a temperature of 60–80° C. with a load of 1000 kgf at 500 rpm with a spindle oil VG2 (hydraulic-pressure parameter, $\lambda$: 0.101) applied as a lubricant. The test provided a result, as shown in Table 3, together with that of a comparative example, a needle roller thrust bearing having a standard roller and a standard cage.

In Table 3, longevity was represented by a 10% longevity of 10 test bearings. Note that the roller had a length of 7.8 mm for a single row and 3.8 mm (by two) for two rows and it was crowned (or dropped) by 5 to 15 micrometers.

As shown in Table 3, if sample 31, which corresponds to a standard bearing, had a longevity of 1, sample 32, having two rows of rollers, had a longevity 2.5 times sample 31. Furthermore, sample 33, having a single row of crowned rollers, had a longevity 4.9 times sample 31. Sample 34, having two rows of crowned rollers, had a longevity 7.5 times sample 31. Samples 31–34 were all comparative examples and their ring surfaces did not contain carbide having a density or an a real percentage falling within the range of the present invention.

As compared with the above comparative examples, two rows of crowned rollers held in a cage and a roller bearing ring containing carbide having a density and an a real percentage falling within the range of the present invention, i.e., sample 35 of an example of the present invention had as much a longevity as 20.6 times greater sample 31, remarkably longer than samples 32–34, with the rollers completely free of flaking. Furthermore in the test a motor consumed a smallest current of 3.9A for sample 35, which value is equivalent to that of sample 34 and the smaller than the other samples and it also indicates that friction loss is small.

From the above results it has been found that a needle thrust bearing having two or more rows of crowned rollers held in a cage and a roller bearing ring of the present invention can effectively reduce friction loss and wear, provide a significantly increased longevity, resistant to that flaking of an edge which starts at a surface thereof after the roller rotates and runs, and prevent the rollers' radially outer surface from flaking.

Combining the crowned roller and the roller bearing ring having a surface layer with a high density of carbide distributed therein, can provide a remarkable resistance to surface-flaking that significantly exceeds an effect achieved by separately adding these requirements to a conventional needle thrust bearing and then adding them together. In other words, resistance to surface-flaking can significantly be enhanced by synergism of a roller that is crowned and a high density of carbide distributed in a surface layer of a roller bearing ring.

Fourth Embodiment

A test was conducted on a needle thrust bearing of a fourth embodiment using two rows of cage-held crowned rollers varying in length having an end surface varying in geometry and a roller bearing ring. As shown in Table 4, of requirements of the present invention, how (b1) the length of the radially outer rollers of the rollers in the two rows, (b2) crowning, (b3) the structure of the pocket of the cage, and (b4) the geometry of the roller's end surface affected longevity resistant to flaking, was examined.

TABLE 4

| Sample no. | Roller Bearing Ring | Radially Inner Roller | | Radially Outer Roller | | Geometry of End Surface of Roller | No. of pockets of cage | 10% Longevity | Portion Flaked | | Motor's Current Consumption (A) |
|---|---|---|---|---|---|---|---|---|---|---|---|
| | | Ratio in Length | Presence/ Absence of Crowning | Ratio in Length | Presence/ Absence of Crowning | | | | Radially Inner Side | Radially Outer Side | |
| 35 | Roller Bearing Ring of Example of the Present Invention | 1 | Present, standard | 1 | Present, standard | Straight | 1 | 1 | edge of inner surface | none | 3.9 |
| 36 | | 1 | Present, standard | 1 | Present, standard | Straight | 2 | 1.5 | edge of inner surface | none | 3.3 |
| 37 | | 1 | Present, standard | 1 | Present, small | Straight | 1 | 1 | edge of inner surface | none | 4.1 |
| 38 | | 1 | Present, standard | 1 | Absent, straight | Straight | 1 | 1 | edge of inner surface | none | 4.3 |
| 39 | | 1 | Present, standard | 1.2 | Present, standard | Straight | 1 | 1.7 | edge of inner surface | none | 3.4 |
| 40 | | 1 | Present, standard | 1 | Present, standard | R | 1 | 1.3 | edge of inner surface | none | 3.5 |
| 41 | | 1 | Present, standard | 1 | Present, standard | R | 2 | 1.6 | edge of inner surface | none | 3.2 |

FIG. 2A illustrates the needle thrust bearing of sample 35. FIG. 2A is a plan view with an upper roller bearing ring removed and FIG. 2B is a cross section of FIG. 2C. Sample 35 provided a single row of pockets each accommodating two rollers arranged to have an axial direction radially.

FIG. 2B illustrates the needle thrust bearing of sample 36. FIG. 2A is a plan view with an upper roller bearing ring removed and FIG. 2B is a cross section of FIG. 2A. According to Table 4, sample 36, with a cage having two rows of pockets, allows rollers to be held further by the cage to reduce the rollers' skew and friction loss and wear and thus provide a longevity 1.5 times sample 35 against flaking.

More than two rows of rollers with radially inner rollers crowned and radially outer rollers less crowned than the radially inner rollers, as provided in sample 37, provided a longevity against flaking that is equivalent to that of sample 35 of an example of the present invention. Furthermore, sample 37 without radially outer rollers crowned, i.e., sample 38 with straight rollers was also equivalent in longevity to sample 35. In samples 37 and 37, increasing a load capacity of the radially outer side effectively prevented flaking of the rollers' radially outer surfaces and the roller bearing ring's radially outer side.

Setting radially outer rollers to be 1.2 times radially inner rollers in length, as provided in sample 39, with the radially inner and outer rollers smaller and larger, respectively, in length than two, inner and outer rows of rollers equal in length, as conventional, increases the radially outer side's load capacity to prevent flaking of the rollers' radially outer surfaces and the roller bearing ring's radially outer side and also reduce the radially inner rollers' differential slip to provide a longevity 1.7 times sample 35. In particular, sample 39, having radially inner rollers reduced in length, reduced the radially inner rollers' differential slip to be smaller than conventional two rows of rollers and thus provided a remarkably increased longevity.

From these results it is apparent that increasing the number of rollers in a radially outer row (or the number of pockets) to be equal to or more than that of rollers in an radially inner row can also increase the radially outer side's load capacity and thus provide a similar effect. This configuration can be implemented for example as the needle thrust bearing as shown in FIG. 2C.

Furthermore, a roller having an end surface protruding in an arc, as provided in samples 40 and 41, prevented rollers from having their end surfaces significantly interfering with each other and the rollers' end surfaces and the cage's pockets from significantly interfering with each other. Furthermore it is also apparent from Table 4 that the rollers' skew is reduced and friction torque is reduced.

Fifth Embodiment

The effectiveness of a needle thrust bearing of the present invention was verified in relation to the anti-wearability of its roller bearing ring. Samples 35 and 31 (standard bearings) and other samples 34 and 32 were rotated under the same conditions as Table 3 for a determined period (of 10 hours). Note that sample 35 had two rows of crowned rollers held in a cage and a roller bearing ring having a surface layer containing at least to a depth of 0.1 mm, as measured from its surface, a carbide having a grain of 0.6 $\mu$m or more in size such that 39,452 of such grains were precipitated for each unitary area of 1 mm$^2$ with an a real percentage of 9.64%. After rotating and running, maximal wearability (in depth) was measured, as shown in Table 5.

TABLE 5

| Sample no. | Specification of Roller Bearing Ring | | Specification of Roller | | Maximum Wearability ($\mu$m) |
|---|---|---|---|---|---|
| | No. of carbide per unit area (mm$^2$) | % of carbide per unit area | Geometry of Roller | No. of Rows of Rollers | |
| 31 (standard bearing) | 6540 | 0.5 | Straight | 1 row | 1.5 |
| 34 (comparative example) | 6540 | 0.5 | Crowned | 2 rows | 0.7 |
| 42 (comparative example) | 39452 | 9.64 | Straight | 1 row | 0.1 |
| 35 (example of the present invention) | 39452 | 9.64 | Crowned | 2 rows | 0.05 |

As measured at an end of the roller bearing ring after rotation and running, samples 31, 34 and 42 provided maximal wearabilities of 1.5 $\mu$m, 0.7 $\mu$m, and 0.1 $\mu$m, respectively, whereas sample 35 achieved a significantly enhanced anti-wearability, providing a maximal wearability of 0.05 $\mu$m.

Although the present invention has been described and illustrated in detail, it is clearly understood that the same is by way of illustration and example only and is not to be taken by way of limitation. For example, most widely, the present invention is applicable to any needle thrust bearing that includes a single row of crowned rollers and a roller bearing ring having a surface layer with a prescribed, high density of carbide distributed therein. The spirit and scope of the present invention being limited only by the terms of the appended claims.

What is claimed is:

1. A roller thrust bearing comprising at least two radially arranged rows of rollers and a cage holding said rollers, at least one of said rollers being crowned, wherein rollers of a radially outer row have a larger effective length than rollers of a radially innermost row.

2. The bearing of claim 1, wherein said cage has a pocket each holding a single roller.

3. The bearing of claim 1, wherein a radially outer row has less crowned rollers than the radially innermost row.

4. The bearing of claim 1, wherein at least one row radially outer than the radially innermost row is formed of straight rollers.

5. The bearing of claim 1, wherein at least one row radially outer than the radially innermost row is formed of rollers larger in length than the radially innermost row.

6. The bearing of claim 1, wherein said roller has at least one end surface spherically shaped.

7. The bearing of claim 1, wherein at least one row radially outer than the radially innermost row has rollers no less in number than the radially innermost row.

8. The bearing of claim 1, wherein said roller is a needle roller.

9. The bearing of claim 1, incorporated in a compressor for use.

10. A roller thrust bearing comprising a crowned roller and a roller bearing ring contacting said roller, said roller bearing ring containing no less than 10,000 to less than 40,000 grains/mm2 of carbide at least to a depth of 0.1 mm, as measured from a surface layer thereof, said grain having a diameter size of no less than 0.6 $\mu$m.

11. The bearing of claim 10, including at least two rows of rollers including at least one crowned roller.

12. The bearing of claim 10, wherein said carbide in said roller bearing ring at said at least surface layer to the depth of 0.1 mm precipitates in a range of no less than 0.8% to less than 10% per unit area.

13. The bearing of claim 10, having at least two rows of rollers, wherein a radially outer row has rollers crowned less than a radially innermost row or free of crowning.

14. The bearing of claim 10, having a cage holding said roller, said cage having a pocket arranged to accommodate no less than two rollers with an axial direction extending radially.

15. The bearing of claim 10, having a cage holding said roller, said cage having at least two rows of pockets each accommodating a single roller.

16. The bearing of claim 10, having at least two rows of rollers, wherein a radially outer row has rollers no less in length than a radially inner row.

17. The bearing of claim 10, wherein said roller has an end surface curved to protrude outward.

18. The bearing of claim 10, having at least two rows of rollers, wherein a radially outer row has rollers no less in number than a radially inner row.

19. The bearing of claim 10, wherein said roller bearing ring has a surface having a Rockwell C scale hardness (HRC) of no less than 58.

20. In an inclined-plate compressor having an inclined plate secured to and rotated around a main shaft to reciprocate a piston, a roller thrust bearing provided at a portion contacting said inclined plate to receive a thrust load introduced as the main shaft rotates and the piston reciprocates, said bearing comprising:

a crowned roller; and a roller bearing ring contacting said roller, said roller bearing ring containing no less than 10,000 to less than 40,000 grains/mm2 of carbide at least to a depth of 0.1 mm, as measured from a surface layer thereof, said grain having a diameter size of no less than 0.6 $\mu$m.

* * * * *